United States Patent
Bjarnason et al.

(10) Patent No.: US 6,434,233 B1
(45) Date of Patent: Aug. 13, 2002

(54) METHOD AND APPARATUS FOR CANCELING PERIODIC INTERFERENCE SIGNALS IN A DIGITAL DATA COMMUNICATION SYSTEM

(75) Inventors: Elias Bjarnason; Ragnar Jonsson; Sverrir Olafsson; Adeline Tracz, all of Reykjavik (IS)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/164,530

(22) Filed: Sep. 30, 1998

(51) Int. Cl.[7] ............................................... H04M 1/00
(52) U.S. Cl. .............................. 379/406.01; 379/406.08
(58) Field of Search ...................... 379/406.01, 406.14; 381/71.1, 103; 375/346; 348/21; 365/73

(56) References Cited

U.S. PATENT DOCUMENTS 5,208,837 A * 5/1993 Richey ........................ 375/346
5,566,167 A * 10/1996 Duttweiler .............. 379/406.14
5,572,262 A * 11/1996 Ghosh ........................... 348/21
5,903,615 A * 5/1999 Thomson et al. ........... 375/229

* cited by examiner

Primary Examiner—Forester W. Isen
Assistant Examiner—Jefferey F. Harold
(74) Attorney, Agent, or Firm—Farjami & Farjami LLP

(57) ABSTRACT

A tone predictor may be employed in a modem system to cancel periodic interference components present in a received signal. The tone predictor may be implemented in a receiver arrangement to cancel such periodic interference and to condition a decision error signal utilized to update the adaptive equalizers. The tone predictor may also be implemented in an echo canceler arrangement to cancel such periodic interference and to condition the error signal used to update the echo canceler filter. The tone predictor includes a delay element, configured to decouple the periodic interference component from other noise components, and an adaptive filter structure configured to generate a periodic interference estimate.

32 Claims, 8 Drawing Sheets

METHOD AND APPARATUS FOR CANCELING PERIODIC INTERFERENCE SIGNALS IN A DIGITAL DATA COMMUNICATION SYSTEM

FIELD OF THE INVENTION

The present invention relates generally to the cancellation of interference signals present in a digital data communication system. More particularly, the present invention relates to the cancellation of periodic interference signals with an adaptive tone predictor.

BACKGROUND OF THE INVENTION

Digital data communication systems that transfer data over the public switched telephone network (PSTN) are generally known. For example, current modem systems, such as those compatible with the ITU-T Recommendation V0.90, are configured to transfer data at theoretical speeds of up to 56 kbps via a digital PSTN. The actual data rate obtained may vary for the particular communication session depending upon various practical factors such as the quality of the communication channel, the existence of digital impairments (e.g., robbed bit signaling and digital pads), and the amount of interference present in the channel. The interference may include a substantially random colored noise component and a component having substantially periodic characteristics.

The minimum signal to noise ratio for the latest generation of modem systems is higher than the corresponding minimum signal to noise ratio of older systems (e.g., voiceband or V0.34 modems). Consequently, such older systems could tolerate a higher amount of additive noise in the communication channel without a sacrifice in performance. Furthermore, the frequency range of periodic interference signals that may appear in the context of older modem systems makes such interference signals tolerable. For example, periodic interference signals in a typical V0.34 modem system have frequencies above 300 Hz. In contrast, periodic interference signals in a typical V0.90 modem system may have frequencies as low as 60 Hz; such low frequency noise may not be tolerable in a V0.90 system.

In current V0.90 modem systems, the additive noise may have an adverse affect on the function of one or both of the end-to-end devices (e.g., the two modems that communicate over the PSTN). For example, during various initialization procedures, a typical V0.90 modem system will perform initial training of its equalizers, echo cancelers, and other adaptive components. Such training procedures are intended to allow the adaptive components to adjust their performance characteristics in accordance with the current line conditions. After the adaptive components are initially trained, the system eventually begins operating in the normal data tracking mode. In most cases, the adaptive components are periodically updated during the data tracking mode in an attempt to optimize the performance of the data communication system.

The receiver section of a modem device generally includes some type of adaptive equalizer structure, e.g., adaptive digital filters, that are designed to characterize the response of the communication channel established between the two modem devices. However, the adaptive equalizers may not be designed to compensate for periodic interference present in the received signal. Accordingly, during the training process, such periodic interference may remain in the equalized signal. Consequently, the training of the receiver equalizers may be affected by the interference and, therefore, they may not be optimally trained.

Prior art receiver arrangements may include a noise predictor (NP) element for canceling the noise components that are uncompensated by the equalizers. However, conventional finite-length NPs may not have the computational power necessary to cancel periodic interference in addition to other forms of additive noise. Accordingly, NP techniques may also lack the ability to adequately cancel periodic interference from the equalized signal.

Prior art echo cancellation schemes (based on adaptive filtering techniques) may also suffer from the above shortcomings of the prior art. As discussed above, periodic interference may be present in the received data signal. Conventional V0.90 echo cancelers do not compensate for periodic noise during training or data tracking. Thus, the periodic interference component will remain and may therefore affect the echo canceler training. The presence of the periodic interference will adversely affect the signal to noise ratio and may result in a lower effective data rate.

SUMMARY OF THE INVENTION

Accordingly, the present invention provides an improved technique for the cancellation of periodic noise in a digital data communication system. The techniques described herein may be utilized in a receiver equalizer context or in an echo canceler context. The present invention also provides a tone prediction scheme that can generate update signals for adaptive components in the communication system. The tone prediction scheme may be implemented in a digital data communication system that is susceptible to periodic interference signals. The techniques of the present invention can be utilized during an initialization mode to enhance the training of adaptive components in the system and/or during the normal tracking mode to maintain an acceptable signal to noise ratio.

The above, and other features of the present invention may be carried out in one form by a method for preconditioning an update signal for an adaptive processing component of a digital data communication system. Such a method may include the steps of receiving a signal containing a periodic interference component, performing a delay operation on the signal to decouple the periodic interference component from the signal, filtering the decoupled periodic signal with an adaptive filter structure to obtain an interference estimate, and generating an update signal in response to the interference estimate. The update signal may be utilized to adjust characteristics of the adaptive processing component.

BRIEF DESCRIPTION OF THE DRAWINGS

A more complete understanding of the present invention may be derived by referring to the detailed description and claims when considered in connection with the FIGS., where like reference numbers refer to similar elements throughout the Figures, and:

DETAILED DESCRIPTION OF PREFERRED EMBODIMENTS OF THE INVENTION

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, look-up tables, and the like, which may carry out a variety of functions under the control of one or more microprocessors or other control devices. In addition, those skilled in the art will appreciate that the present invention may be practiced in any number of data communication contexts and that the modem system described herein is merely one exemplary application for the invention. Further, it should be noted that the present invention may employ any number of conventional techniques for data transmission, training, signal processing and conditioning, and the like. For example, DIGITAL COMMUNICATION, by Lee & Messerschmitt (2nd ed., 1996), contains detailed descriptions of many such techniques (the entire content of this publication is hereby incorporated by reference). Such general techniques and others that may be known to those skilled in the art are not described in detail herein.

Figure 1:
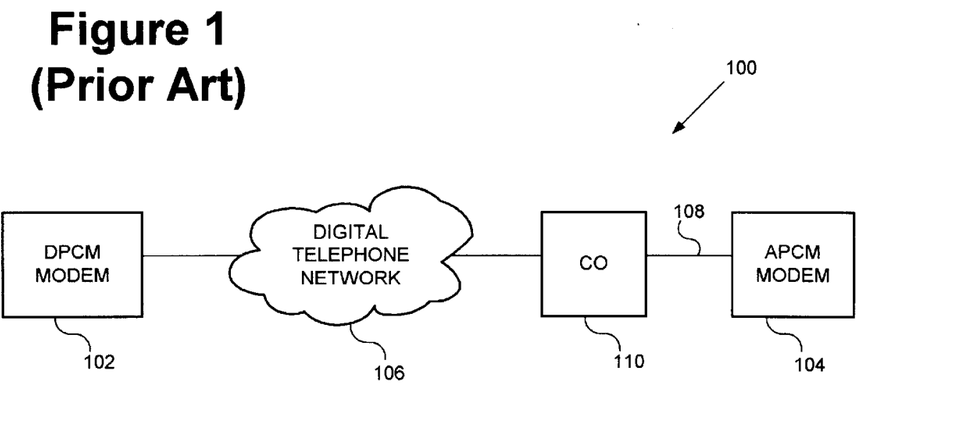
FIG. 1 is a schematic representation of a typical prior art modem system arrangement.

FIG. 1 depicts a conceptual diagram of a typical V0.90 modem system 100. V0.90 modems may achieve end-to-end data rates of up to 56 kbps using current pulse code modulation (PCM) techniques. Generally, modem system 100 includes a server modem 102 and a user modem 104. In accordance with conventional terminology, modem 102 is labeled "DPCM modem" to indicate that it is the digital pulse code modulation modem device in the system. Similarly, modem 104 is labeled "APCM modem" to indicate that it is the analog pulse code modulation modem device. Modem 102 is digitally connected to a digital telephone network 106, e.g., the PSTN, while modem 104 is connected to digital telephone network 106 via an analog local loop 108. The digital connection to digital telephone network 106 enables modem 102 to transmit outgoing data to digital telephone network 106 at 64 kbps.

Digital telephone network 106 is connected to local loop 108 through a central office 110, which may include a number of individual line cards (not shown) associated therewith. The line cards typically have PCM codecs implemented therein. Since the parameters of digital telephone network 106 and the line cards are dictated and set by the operating specifications of the network (and particularly the use of the µ-law or A-law signal point constellations), modem 102 is preferably configured to transmit the digital data in a particular way to fully exploit its digital connection to digital telephone network 106.

Figure 2:
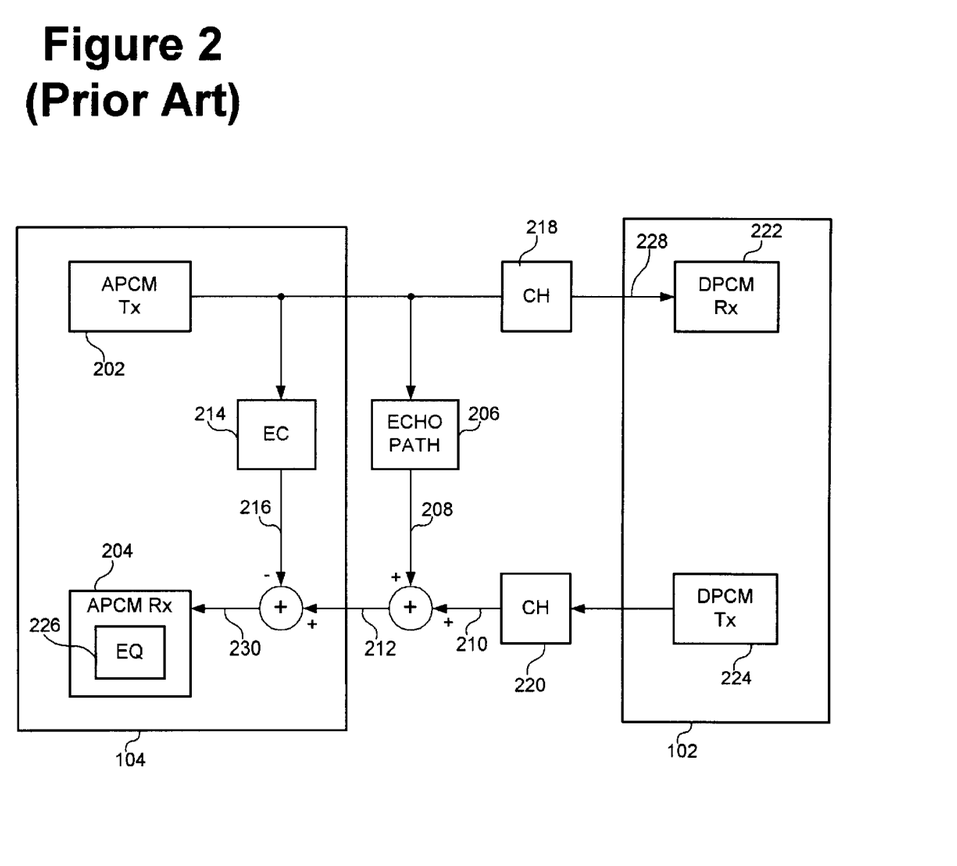
FIG. 2 is a block diagram of a typical prior art modem system and corresponding channel features.

Modem 102 and modem 104 are also depicted in schematic block diagram form in FIG. 2. Although the general architecture shown in FIG. 2 may be shared with prior art modem systems, the techniques of the present invention may be incorporated in such an architecture. FIG. 2 illustrates a portion of modem 104, which includes a transmitter 202 and a receiver 204. Receiver 204 preferably includes (or is at least functionally associated with) an equalizer structure 226. Equalizer structure 226 may be configured to compensate for characteristics, e.g., the impulse response, of channel 220 in a known manner. A signal 230 obtained by receiver 204 may include additive noise such as colored noise and periodic interference. Conventional V0.90 equalization techniques cannot adequately compensate for the presence of periodic interference having a relatively low frequency (e.g., below 200 Hz). Consequently, the signal to noise ratio and the end-to-end data rate may suffer.

As with many practical data communication systems, near-end echo (represented by an echo path 206) associated with a transmit signal may be present in a signal received by modem 104. The characteristics of the near-end echo signal may be dictated by functional components in the upstream and downstream channels and/or processing performed within the telephone network. An echo signal 208 combines with an intended receive signal 210 and a "corrupted" receive signal 212 is then processed by modem 104. In practical applications, receive signal 212 may include periodic interference and other forms of additive noise. In a practical V0.90 system, such periodic interference may take the form of a 60 Hz tone, a 120 Hz tone, or the like.

An echo canceler 214 may be employed by modem 104 to compensate for the near end echo. An echo estimate signal 216 generated by echo canceler 214 is subtracted from receive signal 212; in an ideal system, the unwanted echo is removed by this process. However, in a practical system, echo canceler 214 may not be perfectly tuned due to additive noise (such as periodic interference) present in the received signal.

FIG. 2 also depicts modem 102, which receives data transmitted by modem 104 over an upstream channel 218 and transmits data to modem 104 over a downstream channel 220. Modem 102 includes a receiver 222 and a transmitter 224, each of which may include conventional elements that perform conventional digital communication processes. Modem 102 may perform a number of procedures for handling a received signal 228.

Training techniques are well known in many digital data communication contexts. Indeed, current V0.90 modem systems may include training schemes for the echo cancelers and/or the receiver equalizers. For example, modem 104 may enter a half-duplex training mode during which echo canceler 214 is trained in response to the characteristics of echo path 206. In the half-duplex mode, DPCM transmitter 224 is disabled such that signal 212 only includes echo signal 208 (plus any additive noise). APCM transmitter 202 transmits a known training signal, which is also processed by echo canceler 214. As mentioned above, the goal of echo canceler 214 is to estimate echo signal 208. Accordingly, echo canceler 214 is trained such that an error signal 230 is minimized. In accordance with conventional adaptive equalization techniques, error signal 230 is preferably used as an update signal for the training of echo canceler 214. Once the initial training procedure is completed, echo canceler 214 functions in a normal tracking mode and may be updated periodically. During the tracking mode, error signal 230 would predominantly be the signal transmitted by DPCM transmitter 224.

An adaptive training scheme may also be employed to initially train equalizer structure 226 in response to a known training sequence. In current V0.90 systems, modems 102 and 104 operate in a synchronized manner to process the predetermined training sequence. APCM receiver 204 obtains the training sequence, and adaptively adjusts the filter taps associated with equalizer structure 226 in an attempt to compensate for the impulse response of channel 220. Equalizer structure 226 may receive an update signal based on, e.g., a decision error (described in more detail below). Once equalizer structure 226 is initially trained, it then operates in the normal tracking mode and may be periodically updated to ensure that its filter coefficients are substantially optimized.

Figure 3:
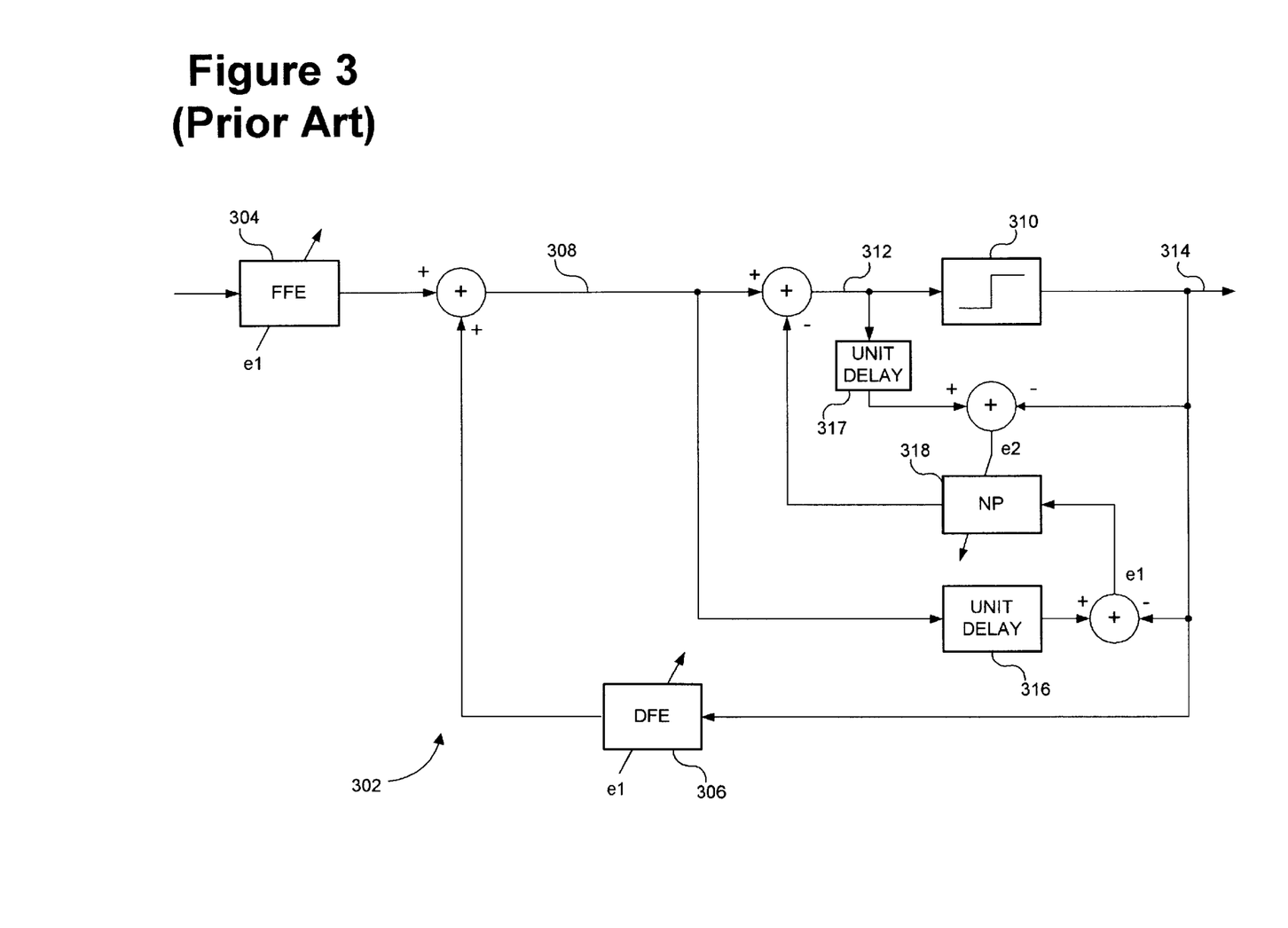
FIG. 3 is a block diagram of a portion of a prior art modem receiver architecture.

FIG. 3 is a schematic block diagram of a portion of a prior art digital data communication receiver 300. Receiver 300 may be implemented in a V0.90 modem such as modem 104. Receiver 300 includes an adaptive equalizer structure 302 that includes a feedforward equalizer (FFE) 304 and a decision feedback equalizer (DFE) 306. Adaptive equalizer structure 302 is configured to equalize an input signal (e.g., a sequence of digital data) such that an equalized signal 308 is produced. In accordance with generally known principles, DFE 306 receives its input from the output of a quantization element, e.g., a slicer 310. Slicer 310 is configured to receive a digital input 312 and generate a quantized output 314 that approximates digital input 312.

A decision error ($e_1$) may be obtained by subtracting the current quantized output 314 from the corresponding digital input associated with equalized sequence 308. A unit delay element 316 (and, as described below, a unit delay element 317) may be employed to compensate for the delay associated with slicer 310 and equalized signal 308. The $e_1$ decision error represents the quantization error associated with slicer 310. The $e_1$ decision error may be utilized to adaptively update FFE 304 and/or DFE 306 in accordance with known principles.

The $e_1$ decision error may also serve as an input to a noise predictor element 318, which is configured to compensate for additive noise that may be present in equalized signal 308 (if additive noise is present in equalized signal 308, then the $e_1$ decision error will also contain the additive noise component). As shown, noise predictor element 318 (which may be realized by an adaptive filter arrangement) can be adjusted in response to an update error signal ($e_2$). The $e_2$ error may be a decision error based on the input and output of slicer 310. As described above, unit delay element 317 delays the input to compensate for the delay of slicer 310. Ideally, noise predictor element 318 and adaptive equalizer structure 302 cooperate to remove an amount of additive noise such that the signal-to-noise ratio (SNR) of receiver 300 is satisfactory.

As discussed above, adaptive equalizer structure 302 may not be capable of effectively compensating for the presence of some additive noise such as periodic interference. Even if adaptive equalizer structure 302 were configured to remove periodic interference from the input signal (by creating a frequency null), in doing so FFE 304 may irretrievably remove some of the information contained in the relevant band. The removal of information by FFE 304 and the subsequent attempt to recreate such information by DFE 306 is a drastic approach that can have an adverse effect on the data rate.

Although noise predictor element 318 is designed to remove unwanted noise from digital input 312 (and, consequently, from quantized output 314), it may not function in an optimum manner where the noise includes periodic interference. For example, in a practical application where noise predictor element 318 is a finite length impulse response filter, it may expend much of its computational power handling the periodic interference. Consequently, noise predictor element 318 may not adequately attenuate other additive noise such as colored noise. Although this practical limitation may be tolerable in modems compliant with previous standards (e.g., V0.32 or V0.34 modems), it may not be desirable in light of the stricter SNR requirements of V0.90 modems.

Figure 4:
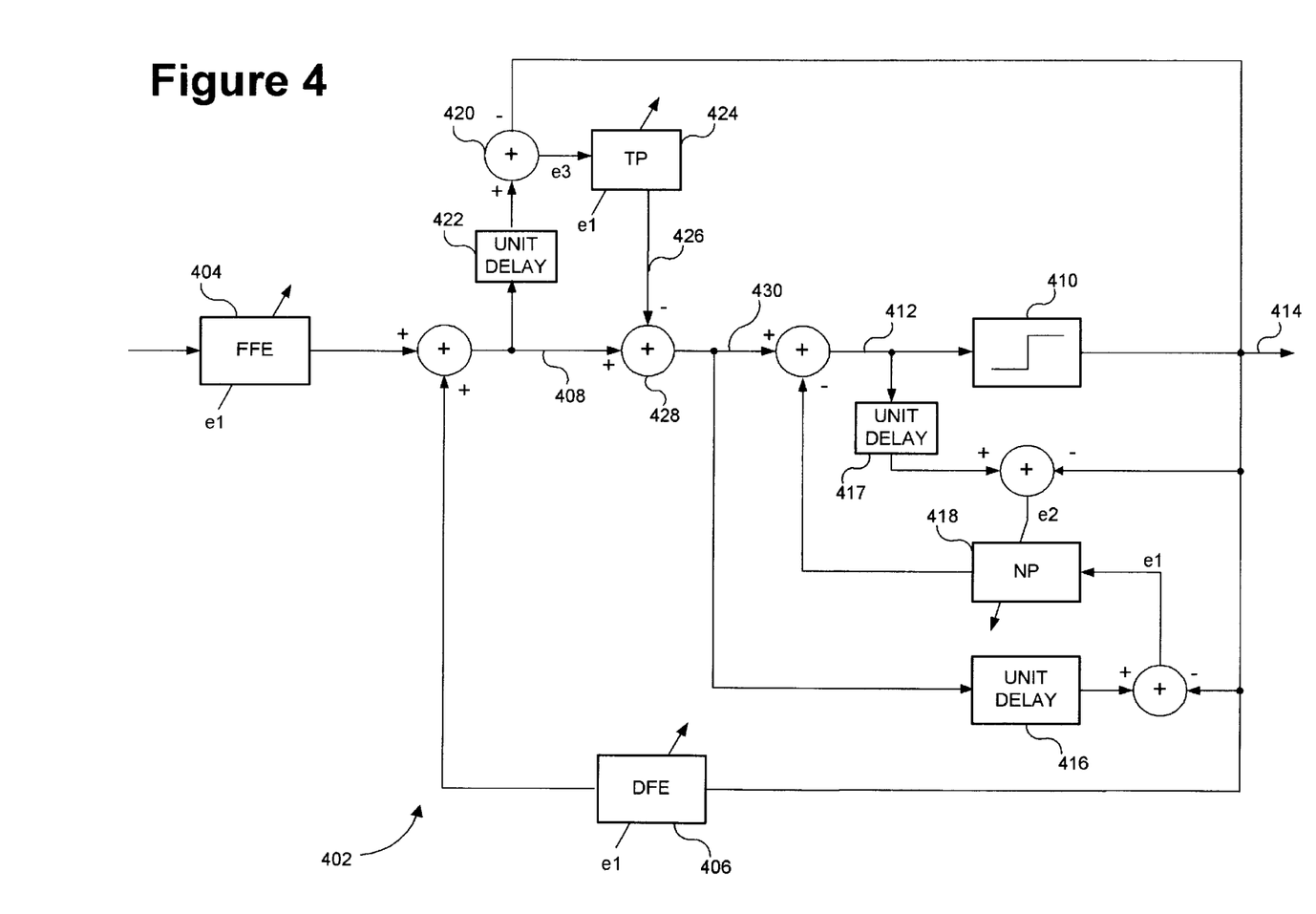
FIG. 4 is a block diagram of a portion of an exemplary modem receiver in accordance with the present invention.

A preferred embodiment of the present invention may be suitably configured to address the above limitations of prior art V0.90 receivers. FIG. 4 is a block diagram representation of an exemplary digital data communication receiver 400 that may be employed in a V0.90 modem context. It should be appreciated that the particular implementation shown in FIG. 4 and described herein is merely exemplary and is not intended to limit the scope of the present invention in any way. Indeed, for the sake of brevity, conventional timing recovery, automatic gain control (AGC), synchronization, training, and other functional aspects of receiver 400 (and other items described herein) are not described in detail herein. Furthermore, the connecting. lines shown in FIG. 4 and other figures contained herein are intended to represent exemplary functional relationships and/or physical couplings between the various elements. It should be noted that many alternative or additional functional relationships or physical connections may be present in a practical communication system.

Figure 9:
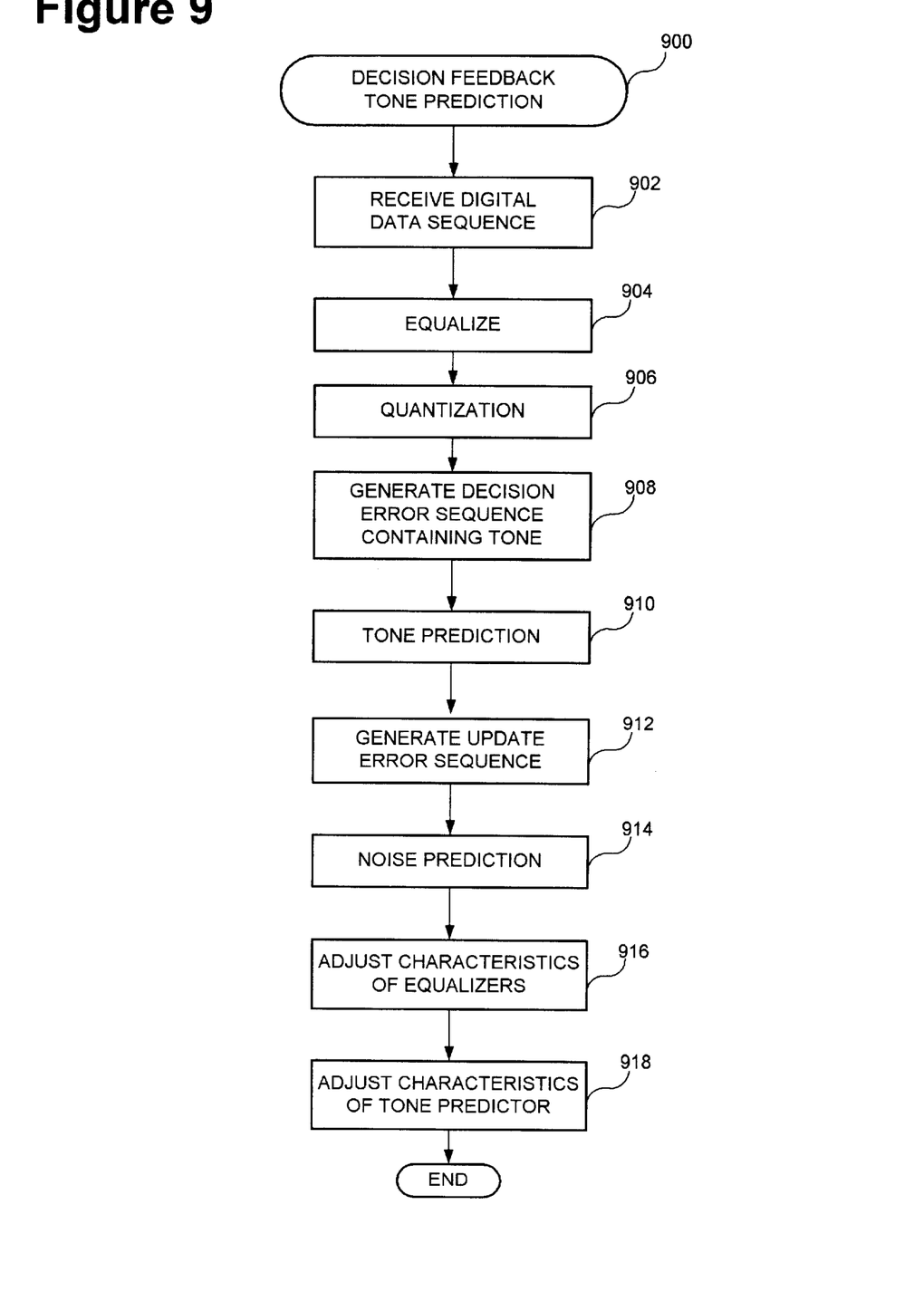
FIG. 9 is a flow diagram of an exemplary tone prediction process that may be performed by the modem receiver shown in FIG. 4.

Receiver 400 will be described in detail below in conjunction with a decision feedback based tone prediction process 900 according to the present invention (see FIG. 9). It should be appreciated that the various tasks set forth in tone prediction process 900 may be carried out by any number of functional elements associated with a software based digital signal processor, digital logic elements, and/or other components that may or may not be shown in FIG. 4.

Receiver 400 may include elements that function similarly to corresponding elements described above in connection with receiver 300 (see FIG. 3). For example, receiver 400 preferably includes an adaptive equalizer structure 402 that includes an FFE 404 and a DFE 406, a slicer 410, unit delay elements 416 and 417, and a noise predictor element 418. Receiver 400 may receive a data sequence corresponding to a signal or sequence transmitted by a remote transmitting device, e.g., another modem (task 902). As described previously, the received data sequence may contain periodic interference components that represent relatively low frequency tones (e.g., less than 500 Hz). As discussed above, the periodic interference component may be associated with the particular communication channel established between the communicating devices. The data sequence is eventually fed into adaptive equalizer structure 402 via FFE 404.

Adaptive equalizer structure 402 is configured to equalize the input sequence in accordance with conventional techniques (task 904). Exemplary adaptive filters and their corresponding update algorithms are described in detail in ADAPTIVE FILTER THEORY, by Simon Haykin (3rd ed., 1996), which is incorporated by reference herein. Adaptive equalizer structure 402 produces an equalized sequence 408 that may contain at least a portion of the periodic interference component. As described above, adaptive equalizer structure 402 may not be capable of effectively compensating for the presence of periodic interference. Further, because a tone predictor 424 preferably removes periodic interference from the equalizer update signal ($e_1$), the equalizer need not compensate for the presence of the periodic interference. Accordingly, the periodic interference or tone will be present in equalized sequence 408.

A task 906 may perform a quantization decision in response to equalized sequence 408 to thereby produce a quantized output sequence 414. The quantization decision performed during task 906 is preferably carried out by slicer 410. As shown in FIG. 4, a digital input 412 to slicer 410 is generated in response to equalized sequence 408. For purposes of this description of the preferred embodiment, digital input 412 may be considered to have the periodic interference and additive noise removed therefrom (described in more detail below). As described above, slicer 410 is preferably configured to generate a particular quantized value, e.g., a certain digital word, that best approximates the current value of digital input 412. In accordance with generally known principles, DFE 406 receives its input from the output of slicer 410.

It should be appreciated that for a specific sample, task 906 may be performed after tone prediction and noise prediction is performed, as described below. The quantization performed by slicer 410 is described herein for the sake of demonstrating the function of tone predictor 424.

Quantized output sequence 414 may also be routed to a summer 420, which is preferably configured to produce an error sequence ($e_3$) based on a difference between equalized sequence 408 and quantized output sequence 414. The generation of the $e_3$ error may be performed during a task 908. In a practical system, equalized sequence 408 may be processed by a unit delay element 422 prior to being processed by summer 420. Unit delay element 422 may be employed because, in the preferred V0.90 embodiment, receiver 400 processes a sequence of digital words at a particular sampling rate and slicer 410 introduces a one-sample delay between its input and output. Accordingly, the $e_3$ error sequence can be considered to be a decision error associated with slicer 410 and equalized signal 408. Assuming that equalized sequence 408 contains periodic interference, the $e_3$ error sequence will also contain a periodic interference component.

As described above, the $e_3$ error sequence may be considered to be a corrupted sequence that contains periodic interference, e.g., a low frequency tone. In the preferred embodiment, the $e_3$ error sequence is utilized as an input to a tone predictor 424, which is configured to generate a periodic interference estimate 426 in response to equalized sequence 408 and, particularly, in response to the $e_3$ error sequence (task 910). Periodic interference estimate 426 is preferably configured to compensate for the periodic interference component present in equalized sequence 408. Such compensation may be carried out by a summer 428, which effectively subtracts periodic interference estimate 426 from equalized sequence 408.

Figure 5:
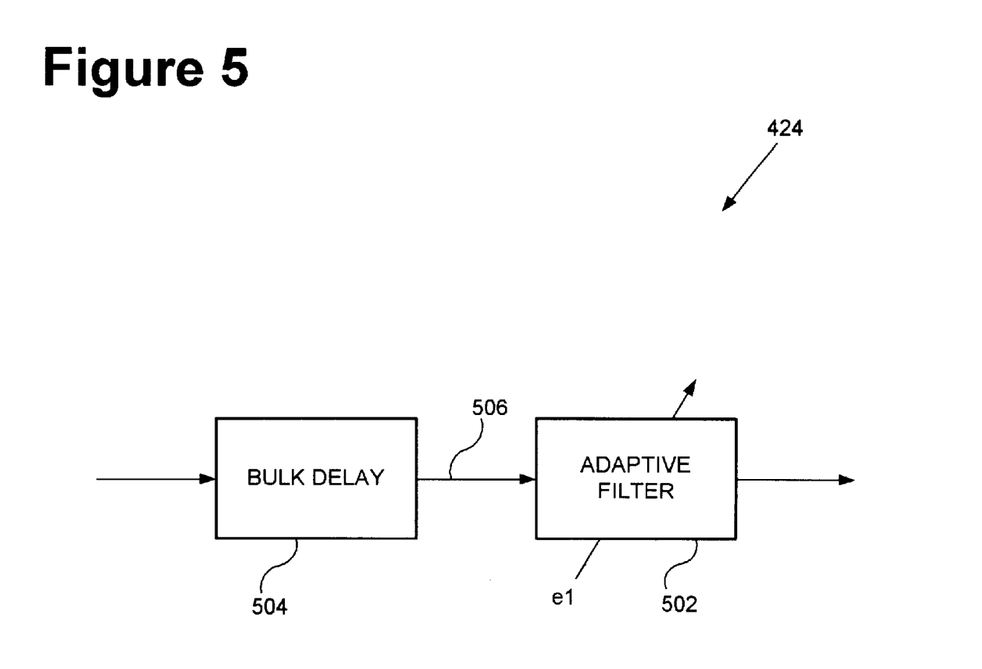
FIG. 5 is a block diagram of an exemplary tone predictor that may be employed by the modem receiver shown in FIG. 4.

In accordance with a preferred aspect of the invention, tone predictor 424 includes an adaptive filter structure 502, as depicted in FIG. 5. In a practical embodiment, adaptive filter structure 502 may be implemented as a finite length impulse response filter that follows a leastmean-square (LMS) update algorithm. Adaptive filter structure 502 may be operatively associated with a delay element 504.

Delay element 504 is preferably configured to suitably decouple the periodic interference component of $e_3$ from the $e_1$ decision error signal (described in more detail below). The output 506 of delay element 504 is preferably fed to adaptive filter structure 502. In the context of the present invention, the delay associated with delay element 504 is preferably longer than the typical impulse response of the communication channel. The particular amount of delay may be predetermined in accordance with empirically determined characteristics of practical channels. The particular delay may be selected in accordance with a desired selectivity for tone predictor 424. For example, increasing the delay increases the selectivity so that periodic signals are more easily detected. In other words, increasing the delay enables tone predictor 424 to correlate the $e_1$ signal with the periodic interference present in the $e_3$ error signal; any nonperiodic interference becomes less correlated. Accordingly, the delay is also preferably selected to be long enough to reduce the likelihood that the $e_1$ error signal will be adversely affected in the absence of periodic interference. As described in more detail below, correlated nonperiodic interference may be processed by noise predictor 418.

Adaptive filter structure 502 is configured to suitably process decoupled periodic sequence 506 to produce periodic interference estimate 426. Adaptive filter structure 502 is adaptively updated in response to an error signal ($e_1$), which is described in more detail below. Ideally, the filter coefficients of adaptive filter structure 502 are periodically updated such that tone predictor 424 produces an accurate estimate for purposes of canceling the tone in equalized sequence 408. As mentioned above, adaptive filter structure 502 may be configured and updated in accordance with any number of known principles such as those described in ADAPTIVE FILTER THEORY, by Simon Haykin.

In a practical V0.90 modem environment, the periodic interference canceled by tone predictor 424 has frequencies below 1 kHz. Thus, depending on the sampling rate of the system, tone predictor 424 can be operated at a reduced rate (described in more detail below). A sufficient length of an LMS filter utilized for adaptive filter structure 502 can be given by the following expression: N≈($f_s/f_M$), where $f_s$ is the sampling frequency and $f_M$ is the minimum out of all possible combinations of $f_i$,|($f_s/2$)−$f_i$|, and |$f_i$−$f_j$|/2, where $f_i$>$f_j$. The frequencies $f_i$ and $f_j$, for (i,j)=1, 2, . . . , L, are the natural interference frequencies in the system. For tone canceler 424 to converge fast and far enough below the noise level, N is preferably greater than ten.

Figure 6:
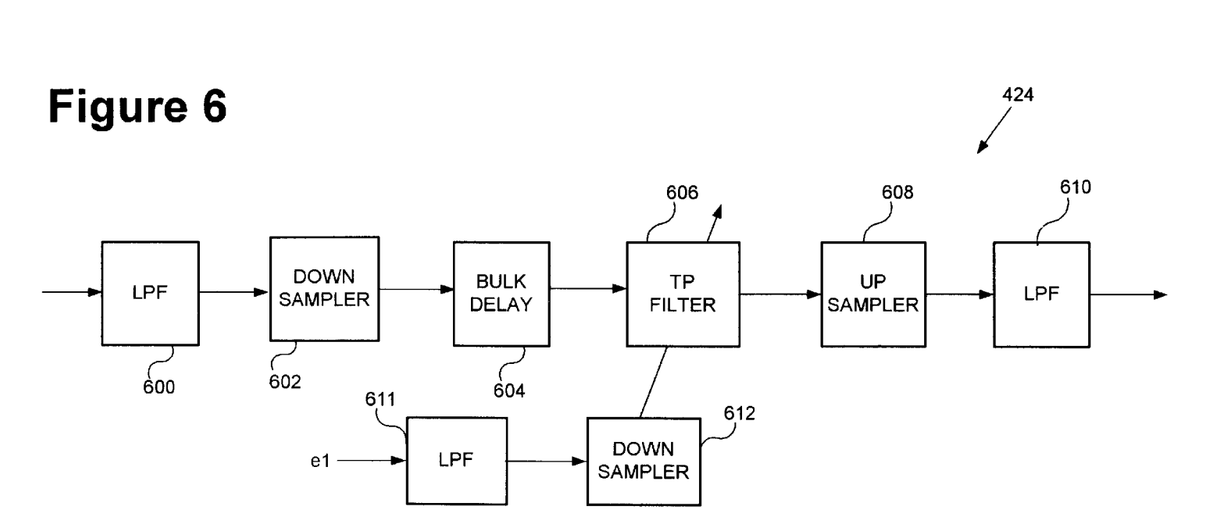
FIGS. 6 & 7 are block diagrams of exemplary tone predictors in accordance with alternate embodiments of the present invention.

In accordance with an alternate embodiment, tone predictor 424 may be configured to operate at a reduced sampling rate, as illustrated in FIG. 6. This multirate embodiment takes advantage of the fact that, in a practical V0.90 system, the bandwidth of the PCM transmit signals is 4 kHz (at an 8 kHz sampling rate) but the majority of the interfering tones are at frequencies below 1 kHz. Accordingly, the periodic interference signals are over sampled by 4 times. This characteristic allows tone predictor 424 to be implemented in a manner that requires less computational complexity and less memory. For example, a multirate structure may be employed where the tone predictor filter operates at a lower sampling rate than the rest of receiver 400 (see FIG. 4).

For purposes of this description, FIG. 6 can be considered to show the functional components of tone predictor 424. However, in a practical embodiment, one or more of the elements shown in FIG. 6 may be realized as discrete components rather than as an integrated assembly. In this alternate embodiment, tone predictor 424 preferably includes an input low pass filter (LPF) 600, a down sampler 602, a delay element 604, an adaptive filter structure 606, an up sampler 608, an output LPF 610, an error LPF 611, and a down sampler 612.

Input LPF 600 is configured to filter the $e_3$ error sequence as it enters tone predictor 424. Input LPF 600 is preferably configured with a bandwidth of one-fourth the Nyquist rate to substantially prevent aliasing when the signal is eventually down sampled by down sampler 602. As shown, an output of input LPF 600 is operatively associated with an input of down sampler 602. Down sampler 602 may be configured in accordance with known principles to suitably reduce the sampling rate to one-fourth of the normal rate. The output of down sampler 602 is operatively associated with an input of delay element 604, which may be configured in a similar manner as delay element 504 (see FIG. 5).

The output of delay element 604 is operatively associated with an input of adaptive filter structure 606, which may be configured in a similar manner as adaptive filter structure 502. Adaptive filter structure 606 operates at one-fourth the sampling rate of receiver 400, which greatly reduces the computational load associated with its operation and updating. For proper operation, the update signal, e.g., the $e_1$ signal, is filtered by error LPF 611 and down sampled by a factor of four by down sampler 612.

The output of adaptive filter structure 606 may be operatively associated with up sampler 608 to increase the sampling rate to the normal rate. Thereafter, the output of up sampler 608 is filtered by LPF 610. LPF 610 has a preferred bandwidth of one-fourth the Nyquist rate to suitably remove the frequency replicas produced by the up sampling process. The computational load of adaptive filter structure 606 is reduced because it operates at one-fourth the original sampling rate and because its filter length can be shorter, i.e., it can be implemented with fewer filter taps. The length of adaptive filter structure 606 is preferably such that it can hold at least about half of one period of the lowest frequency (or difference between two frequencies) it is to predict. At one-fourth the original sampling rate, it can be approximately one-fourth the length. Thus, the computational load of adaptive filter structure 606 can be reduced to about one-sixteenth of its original load by using the one-fourth sampling rate. This otherwise substantial reduction in computational load is partially lost to the computational load associated with the down and up sampling processes.

Figure 7:
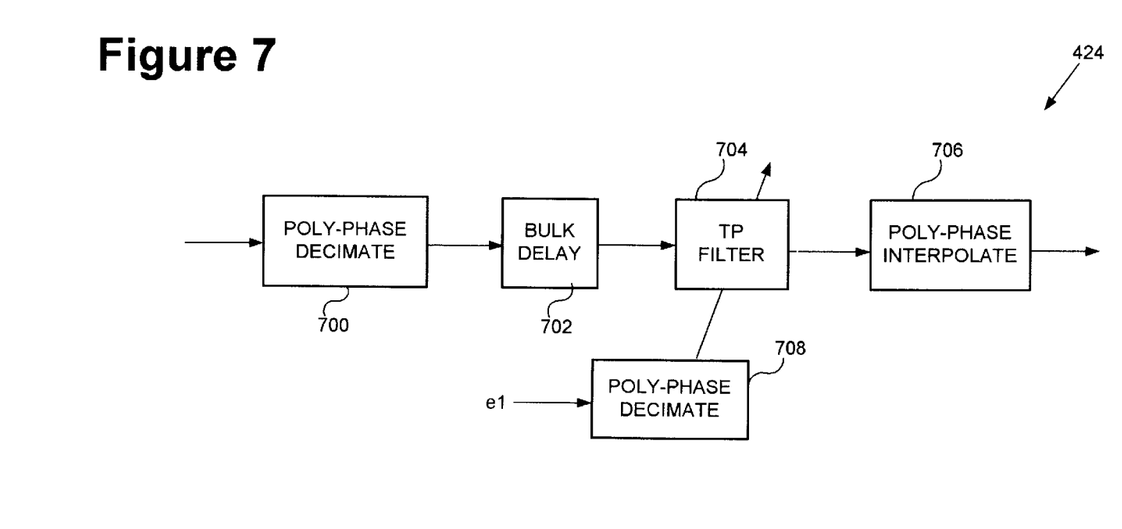

Referring now to FIG. 7, the computational load associated with the above down and up sampling procedures can be reduced by implementing poly-phase filter structures. The preferred exemplary poly-phase embodiment generally includes a poly-phase decimator 700, a delay element 702, an adaptive filter structure 704, a poly-phase interpolator 706, and a poly-phase decimator 708. Decimators 700, 708 and interpolator 706 suitably filter the respective sequences and suitably adjust the sampling rate. In this embodiment, a variation of the LMS algorithm may be utilized (e.g., an FXLMS algorithm) to increase stability over the entire frequency range. A typical FXLMS algorithm that may be utilized in this context is described in "On Adaptive Inverse Control" by Bernard Widrow et al., 15th Asilomar Conf. Circuits, Systems, and Components, pp. 185–89 (1981).

As shown, the $e_3$ error signal may be fed into decimator 700, which is preferably configured to filter the incoming signal and reduce the sampling rate by a factor of four without introducing frequency aliasing. The output of decimator 700 may be operatively associated with delay element 702, which in turn may be operatively coupled to adaptive filter structure 704. Decimator 708 is preferably utilized to condition the $e_1$ error such that it may be used as a proper update signal for adaptive filter structure 704. The output of adaptive filter structure 704 may be operatively associated with an input to interpolator 706, which is suitably configured to filter the signal output from adaptive filter structure 704 and increase the sampling rate by a factor of four without introducing spectra replicas at higher frequencies.

The poly-phase procedure may be carried out in the following manner. First, the current phase is found by updating a phase index (phase count) associated with the poly-phase structure. For the above example, a modulo-4 phase counter (i.e., 0, 1, 2, 3, repeat) may be utilized for the phase index and be incremented once per sample. If the poly-phase count is zero, then the current input sample is passed to the decimator poly-phase filter and a new decimated value is constructed. The decimated value is processed by the adaptive tone predictor and the tone predictor is adapted if appropriate. The output of the tone predictor is passed to the interpolation poly-phase filter where it is stored in a delay line for later use and used to produce a new output sample that is the output of the overall poly-phase structure. If the phase index is not zero, then the current input sample may be stored in a delay line for later use to create a decimated sample in phase zero. Then, an output sample is produced by the poly-phase interpolator based on its current delay line and the appropriate poly-phase filter coefficients. This general flow may be altered in accordance with the particular application.

The embodiment described above in connection with FIG. 7 can reduce the computational load of the upsampling and downsampling operation of tone predictor 424 to about one-fourth the load associated with the embodiment shown in FIG. 6. In addition, the memory requirements of the poly-phase implementation can be reduced.

Although the above alternate embodiments have been described in the context of four-times down sampling, up sampling, decimation, and interpolation, the particular amount of sampling rate adjustment is not so limited. Indeed, a specific application of the tone prediction techniques of the present invention may implement any suitable sampling rate adjustment (if desired) to reduce the computational load associated therewith. Furthermore, such implementation is not limited to baseband systems and could also be used in bandpass systems.

Referring again to FIG. 9, and with continued reference to FIG. 4, tone predictor 424 performs suitable filtering to substantially decouple the periodic interference from the other noise present in the $e_3$ signal. In a practical embodiment, the output of tone predictor 424 contains the periodic interference component that is tuned to have certain amplitude and phase characteristics that enable proper cancellation. Following task 910, a substantially toneless sequence 430 is produced. It should be appreciated that a realistic practical system may not be capable of completely removing the periodic interference from equalized sequence 408. Nonetheless, for the sake of clarity, this description refers to the compensated output of summer 428 as being toneless.

The $e_1$ decision error may be generated (task 912) by subtracting the current symbol or digital word associated with quantized output 414 from the corresponding symbol or digital word associated with toneless sequence 430. As described above, unit delay element 416 may be employed to compensate for the delay associated with slicer 410. As shown in FIG. 4, if an amount of additive noise remains in toneless sequence 430, then the $e_1$ error will predominantly be the residual additive noise component.

The $e_1$ error sequence preferably serves as an input to noise predictor 418. In the preferred embodiment, noise predictor 418 is employed to further reduce the amount of additive noise, e.g., colored noise, that may remain after equalization and tone prediction (task 914). As described above in connection with FIG. 3, noise predictor element 418 and adaptive equalizer structure 402 preferably cooperate to enhance the signal-to-noise ratio (SNR) of receiver

400. Although shown and described for the sake of completeness, noise predictor 418 and the corresponding noise prediction procedure is optional in a practical embodiment.

A task 916 may be performed to suitably adjust characteristics of adaptive equalizer structure 402, which is one example of an adaptive processing component of receiver 400 that may be responsive to the $e_1$ decision error. In other words, the $e_1$ sequence is preferably used as an update sequence (which is generated in response to periodic interference estimate 426, toneless sequence 430, and/or quantized output 414). As in the arrangement of FIG. 3, the $e_1$ decision error may be utilized to adaptively update the filter tap coefficients of FFE 404 and/or DFE 406 in accordance with known principles. Accordingly, the techniques of the present invention may be applied to precondition the $e_1$ update error signal used for one or more adaptive processing elements employed by the digital data communication system.

In addition to task 916, a task 918 may be performed by receiver 400 to suitably adjust characteristics of tone predictor 424 in response to the $e_1$ sequence. As described above, tone predictor 424 may include an adaptive filter structure having filter coefficients that can be updated to adjust the impulse response of the filter such that periodic interference estimate 426 accurately emulates the actual tone present within equalized sequence 408.

Receiver 400 may undergo an initialization or training period during which the various adaptive components (e.g., FFE 404, DFE 406, tone predictor 424, and noise predictor 418) and other components, such as slicer 410, are tuned. In one exemplary embodiment, noise predictor 418 is disabled while FFE 404 and DFE 406 are trained in response to a predetermined training sequence that may be transmitted by the remote modem device. Because receiver 400 is assumed to have prior knowledge of the transmitted training signal, FFE 404 and DFE 406 can be trained to compensate for the line characteristics of the communication channel. In an alternate embodiment, receiver 400 may be configured such that one or more adaptive components may be adjusted in response to a "blind" training procedure, i.e., the training does not rely on a known reference training signal.

Tone predictor 424 may also be initially trained while noise predictor 418 is disabled. After adaptive equalizer structure is suitably trained, noise predictor 418 may be enabled and trained in an appropriate manner. Thereafter, the system may proceed into its normal data tracking mode. It should be appreciated that the particular training procedure and the specific order in which the various adaptive components are trained may differ from application to application.

Figure 8:
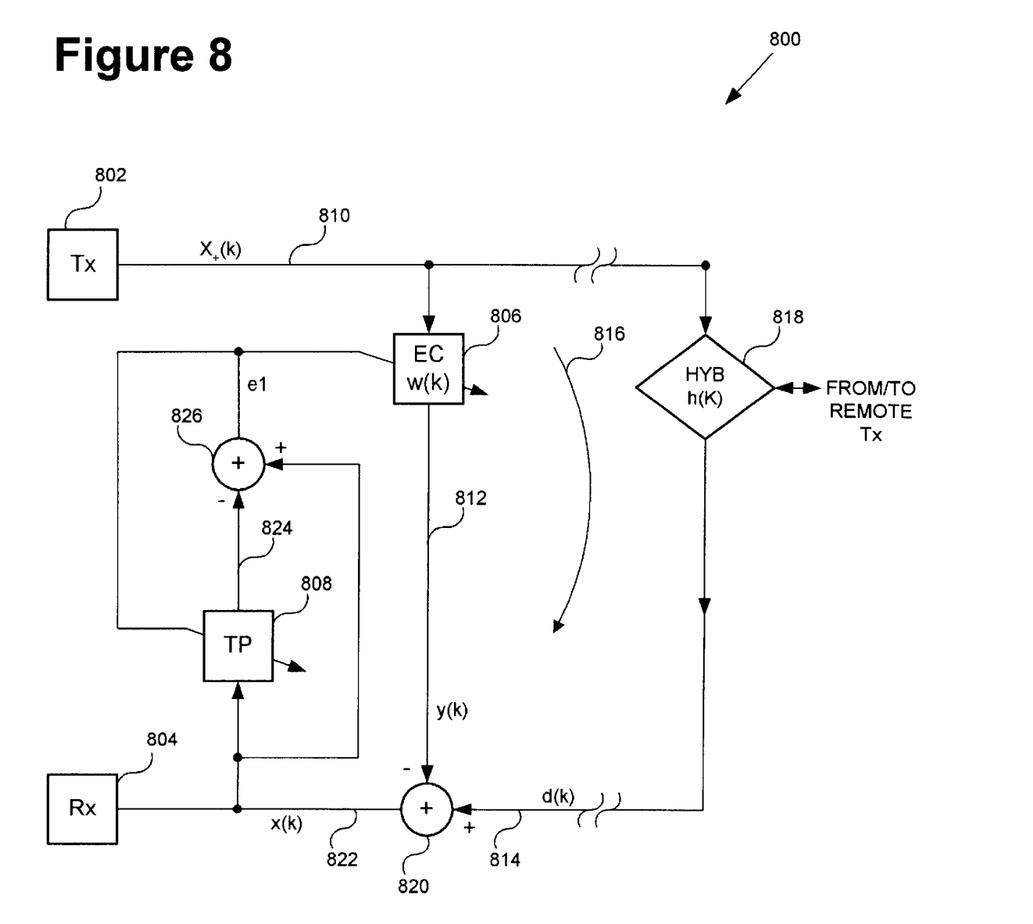
FIG. 8 is a block diagram of an exemplary echo canceler arrangement in accordance with the present invention.

The tone prediction techniques of the present invention can be extended to any number of digital data communication applications where periodic interference may occur and interfere with the performance of an adaptive processing component. In an alternate implementation of the present invention, the tone prediction scheme is employed in a near-end echo cancellation system, as depicted in FIG. 8. FIG. 8 depicts a portion of an exemplary digital data communication device, such as a modem 800. As explained above, for the sake of clarity, many functional components that may be present in a practical implementation, such as encoders, decoders, equalizers, processors, and the like, are not shown or described herein.

Figure 10:
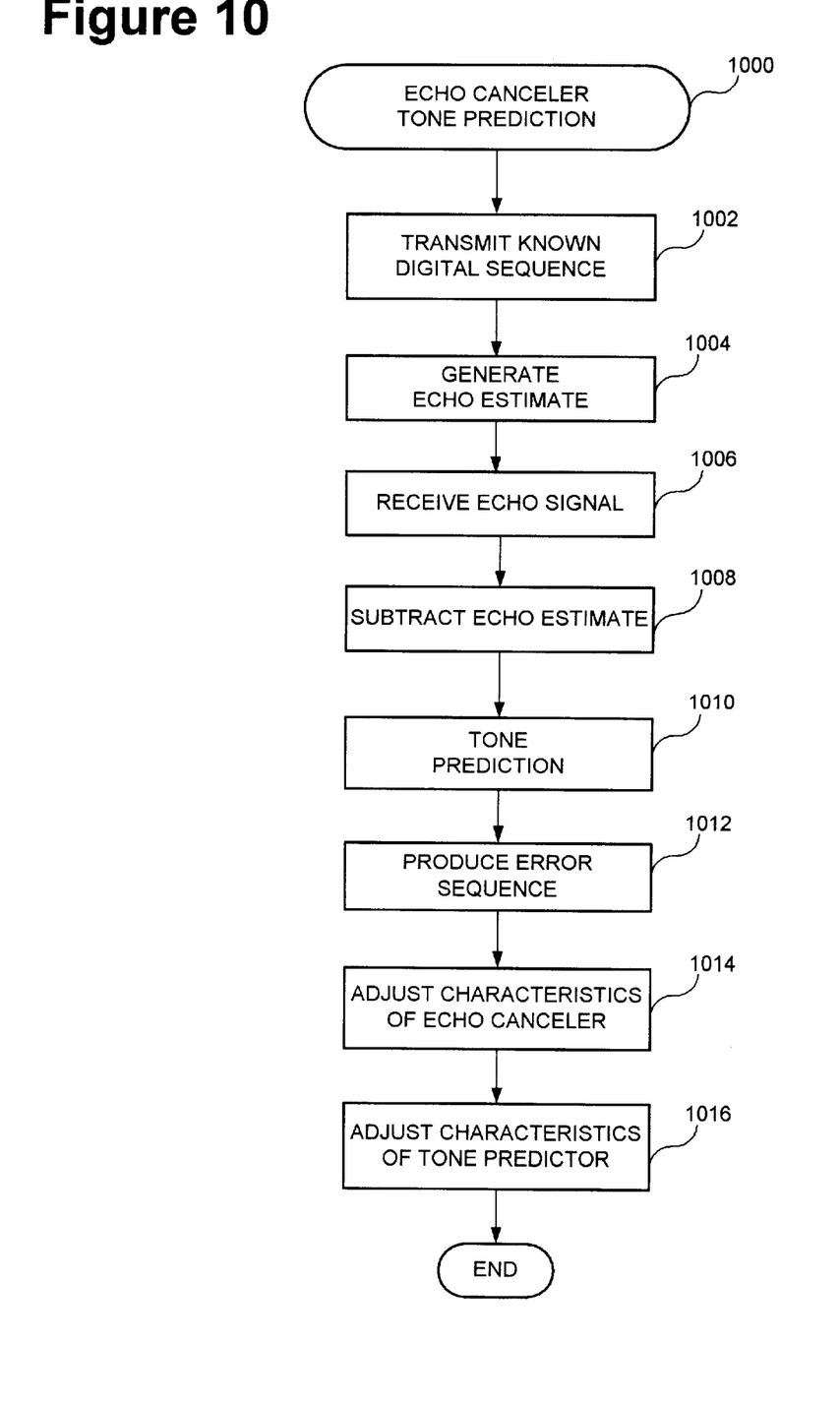
FIG. 10 is a flow diagram of an exemplary tone prediction process that may be performed by the echo canceler arrangement shown in FIG. 8.

FIG. 10 is a flow diagram of an exemplary tone prediction process 1000 that may be performed by modem 800 in association with its echo cancellation scheme. For purposes of this description, the echo cancellation feature of modem 800 and process 1000 will be described in the context of a half-duplex echo cancellation training mode. In other words, it is assumed that the remote transmitter is effectively disabled such that modem 800 can detect and analyze a substantially isolated echo signal without having to process a data signal. Of course, the techniques described herein can be extended to the normal data tracking mode when the echo cancellation techniques are actually implemented.

Modem 800 generally includes a transmitter section 802, a receiver section 804, an echo canceler 806, and a tone predictor 808. Transmitter 802 may be configured to transmit digital data in the form of codewords (as in a V0.90 modem application) or to transmit an analog representation of digital data (as in an analog modem application). For illustrative purposes, modem 800 may be considered to be a V0.90 client modem configured to transmit digital data to the telephone network. Accordingly, during an echo canceler training mode, transmitter 802 preferably transmits a known sequence 810 to the remote modem device (task 1002).

Sinusoidal interference, e.g., periodic interference, present in a signal received by modem 800 may limit the cancellation gain of echo canceler 806 to a few decibels below the level of the tonal interference. Even assuming that echo canceler 806 has an optimal step size control algorithm, the slow convergence of echo canceler 806 and the limited numerical resolution due to a small step size may not serve to improve the gain. In contrast to prior art echo cancellation techniques, the use of tone predictor 808 enables echo canceler 806 to quickly cancel the echo and in an amount well below the level of the sinusoidal disturbance. An exemplary system implementing the techniques of the present invention can reduce the echo component down to the level of the broadband background noise present in the receive signal.

Echo canceler 806 obtains digital sequence 810 at a suitable point along the data path. For simplicity, FIG. 8 depicts a general schematic that is consistent with conventional representations of echo canceler arrangements; an actual implementation may vary from that shown. Echo canceler 806 is preferably configured as an adaptive processing component, e.g., an adaptive filter structure having adjustable filter tap coefficients; echo canceler 806 may be realized by any number of conventional structures. In one exemplary embodiment, echo canceler 806 is configured as an adaptive digital filter that employs an LMS algorithm. Exemplary LMS filters, and other suitable arrangements are described in detail in ADAPTIVE FILTER THEORY, by Simon Haykin. Echo canceler 806 suitably generates an echo estimate 812 in response to digital sequence 810 (task 1004). In an ideal system that is optimally trained, echo canceler 806 generates echo estimate 812 such that it accurately predicts an echo signal 814.

In accordance with known characteristics of transmission systems such as the PSTN, an echo path 816 conveys echo signals between transmitter 802 and receiver 804. In a practical telephone network based modem system, echo signal 814 is predominantly generated in response to the characteristics of a hybrid 818 and the input impedance to the line. Accordingly echo signal 814 is generated in response to digital sequence 810 and in response to the characteristics of hybrid 818. As mentioned above, during the normal data tracking mode, echo signal 814 would actually be a receive signal corrupted with an echo component.

Modem 800 eventually receives echo signal 814 in a conventional manner via hybrid 818 and/or any number of transmission lines (task 1006). When received by modem 800, echo signal 814 may also be corrupted by a periodic interference component associated with the digital communication system and/or the PSTN. As stated above, in a practical V0.90 modem system, such periodic interference may take the form of low frequency tones. A summer 820 (or any suitable processing component) is configured to subtract the current value associated with echo estimate 812 from the current value associated with echo signal 814 (task 1008).

If periodic interference is present in echo signal 814, a conventionally adapted echo canceler 806 would not be capable of removing the interference. Accordingly, the "echoless" or echo-reduced sequence 822 may conceivably include a periodic interference component. In accordance with the preferred embodiment, echoless sequence 822 is utilized as an input to tone predictor 808, which is configured to perform a tone prediction procedure (task 1010) similar to that described above in connection with task 910, but any input sequence containing information about the tonal interference can be used. In this context, echo canceler 806 is one example of an adaptive processing component having an adaptive filter structure, and the "tone corrupted" input sequence to tone predictor 808 may be considered to be related to an output sequence of echo canceler 806 and the received echo signal 814 (during normal operation, signal 814 is the received input signal including an echo component).

But for the specific filter length, filter tap values, and/or other specific functional characteristics, the configuration and function of tone predictor 808 is substantially similar to tone predictor 424 (see FIGS. 4–7). Accordingly, the above description of tone predictor 424 may be referred to in this context. Tone predictor 808 is configured to generate a periodic interference estimate 824 in response to echoless sequence 822. A summer 826, or any suitably equivalent functional element, is preferably configured to produce an error sequence ($e_1$) in response to a difference between the tone-corrupted echoless sequence 822 and periodic interference estimate 824 (task 1012). This $e_1$ error sequence may be analogized to any one of the error signals generated in response to periodic interference estimate 424 described above in connection with FIG. 4.

As depicted in FIG. 8, the $e_1$ error signal may serve as an adaptive update signal for echo canceler 806. Consequently, a task 1014 may be performed to cause echo canceler 806 to adjust its characteristics in response to the $e_1$ error. As described above, echo canceler 806 may leverage any number of known adaptive filter algorithms, e.g., the LMS algorithm. Due to the interaction between tone predictor 808 and echo canceler 806, echo estimate 812 is suitably configured to compensate for echo signal 814 regardless of the presence of periodic interference in echo signal 814.

In addition to task 1014, a task 1016 may be performed by modem 800 to suitably adjust characteristics of tone predictor 808 in response to the $e_1$ sequence. As described above, tone predictor 808 may include an adaptive filter structure having filter coefficients that can be updated to adjust, e.g., the impulse response of the filter such that periodic interference estimate 824 accurately emulates the actual tone present within sequence 822.

As described above, tone predictor 808 improves the gain of echo canceler 806 by canceling the periodic interference in the error path associated with echo canceler 806 (the error path is represented by the $e_1$ signal in FIG. 8). Tone predictor 808 is preferably arranged such that it affects the characteristics of the $e_1$ error (used to update echo canceler 806) and such that it does not directly interfere with the normal receive path associated with receiver 804.

In summary, the tone prediction technique of the present invention may be employed to cancel periodic noise in a digital data communication system. A tone predictor can be suitably configured to operate in conjunction with a receiver equalizer, a transmitter echo canceler, or any adaptive component in the communication system. In accordance with a preferred aspect of the invention, the tone prediction scheme conditions an error signal associated with an adaptive equalization structure, e.g., an FFE/DFE arrangement or an echo canceler filter architecture. The tone prediction technique is capable of canceling any periodic interference. Furthermore, the techniques of the present invention can be utilized during an initialization mode to enhance the training of adaptive components in the system or during the normal data tracking mode to maintain an acceptable signal to noise ratio.

The present invention has been described above with reference to certain preferred embodiments. However, some changes and modifications may be made to the preferred embodiments without departing from the scope of the present invention. For example, the polarity of the various summing and subtraction components associated with outputs of filter elements may be reversed to contemplate variations in the signs of the filter tap coefficients. In addition, a number of inputs, outputs, signals, and sequences may be associated with or generated in response to any number of other inputs, outputs, signals, and sequences. In the context of this description, such responsiveness or association includes any simple "cause and effect" relationship between a signal produced by one component and a signal produced by another component or between an update signal and the output of the respective adaptive component. These and other changes or modifications are intended to be included within the scope of the present invention, as expressed in the following claims.

What is claimed is:

1. A method for canceling periodic interference in a digital data communication system comprising a first device and a remote second device having a receiver configured to receive signals from said first device, said method comprising the steps of:

receiving an input sequence at said second device, said input sequence including a substantially periodic interference component;

equalizing said input sequence with an adaptive equalizer to thereby produce an equalized sequence, said equalized sequence including at least a portion of said periodic interference component;

performing a quantization decision in response to said equalized sequence to thereby produce a quantized output sequence;

producing an error sequence based on a difference between said equalized sequence and said quantized output sequence; and generating a periodic interference estimate in response to said error sequence, said periodic interference estimate being used to compensate for said periodic interference component.

2. A method according to claim 1, further comprising the step of subtracting said periodic interference estimate from said equalized sequence to thereby produce a toneless sequence.

3. A method according to claim 2, further comprising the steps of:

generating a decision error based on a difference between said quantized output sequence and said toneless sequence; and adjusting characteristics of said adaptive equalizer in response to said decision error.

4. A method according to claim 3, wherein said adjusting step comprises the step of processing a least-mean-square algorithm associated with said adaptive equalizer.

5. A method according to claim 2, wherein said input sequence further includes a noise component, and said method further comprising the steps of:
generating a decision error based on a difference between said quantized output sequence and said toneless sequence;
producing a noise component estimate based on said decision error; and
subtracting said noise component estimate from said toneless sequence.

6. A method according to claim 1, wherein said periodic interference estimate is generated by an adaptive tone predictor, and wherein said method further comprises the steps of:
generating a decision error based on a difference between said quantized output sequence and said toneless sequence; and
adjusting characteristics of said adaptive tone predictor in response to said decision error.

7. A method according to claim 1 further comprising the step of delaying said equalized sequence to obtain a delayed equalized sequence, wherein said producing step produces said error sequence based on a difference between said delayed equalized sequence and said quantized output sequence.

8. A method according to claim 1 further comprising the steps of:
down-sampling said equalized sequence to reduce a sampling rate associated with said equalized sequence; and
up-sampling said periodic interference estimate to increase a sampling rate associated with said periodic interference estimate.

9. A method for canceling periodic interference in a digital data communication system comprising a first device having a transmitter configured to transmit signals to a remote second device and a receiver configured to receive signals from said remote second device, where an echo path conveys echo signals between said transmitter and said receiver, said method comprising the steps of:
transmitting an original sequence from said first device;
receiving an echo-corrupted sequence at said first device, said echo-corrupted sequence including an echo component associated with said original sequence and a periodic interference component;
generating an echo estimate in response to said echo-corrupted sequence, said echo estimate being used to compensate for said echo component, wherein said echo estimate is generated by an adaptive echo canceler;
subtracting said echo estimate from said echo-corrupted sequence to obtain an echoreduced sequence;
generating a periodic interference estimate in response to said echo-reduced sequence;
producing an error sequence based on a difference between said echo-reduced sequence and said periodic interference estimate; and
adjusting characteristics of said adaptive echo canceler in response to said error sequence.

10. A method according to claim 9, wherein said adjusting step comprises the step of processing a least-mean-square algorithm associated with said adaptive echo canceler.

11. A method according to claim 9 further comprising the step of delaying said echo-reduced sequence to obtain a delayed echo-reduced sequence, wherein said generating step generates said periodic interference estimate in response to said delayed echo-reduced sequence.

12. A method according to claim 9 further comprising the steps of:
down sampling said echo-reduced sequence to reduce a sampling rate associated with said echo-reduced sequence; and
up sampling said periodic interference estimate to increase a sampling rate associated with said periodic interference estimate.

13. A method for canceling periodic interference in a digital data communication system comprising a first device having a transmitter configured to transmit signals to a remote second device and a receiver configured to receive signals from said remote second device, where an echo path conveys echo signals between said transmitter and said receiver, said method comprising the steps of:
transmitting an original sequence from said first device;
receiving an echo-corrupted sequence at said first device, said echo-corrupted sequence including an echo component associated with said original sequence and a periodic interference component;
generating an echo estimate in response to said echo-corrupted sequence, said echo estimate being used to compensate for said echo component;
subtracting said echo estimate from said echo-corrupted sequence to obtain an echoreduced sequence;
generating a periodic interference estimate in response to said echo-reduced sequence, wherein said periodic interference estimate is generated by an adaptive tone predictor;
producing an error sequence based on a difference between said echo-reduced sequence and said periodic interference estimate; and
adjusting characteristics of said adaptive tone predictor in response to said error sequence.

14. A method according to claim 13, wherein said adjusting step comprises the step of processing a least-mean-square algorithm associated with said echo canceler.

15. A method according to claim 13 further comprising the step of delaying said echo-reduced sequence to obtain a delayed echo-reduced sequence, wherein said generating step generates said periodic interference estimate in response to said delayed echo-reduced sequence.

16. A method according to claim 13 further comprising the steps of:
down-sampling said echo-reduced sequence to reduce a sampling rate associated with said echo-reduced sequence; and
up-sampling said periodic interference estimate to increase a sampling rate associated with said periodic interference estimate.

17. A communication device capable of canceling periodic interference, said communication device comprising:
a receiver configured to receive an input sequence, said input sequence including a substantially periodic interference component;
an adaptive equalizer configured to equalize said input sequence to produce an equalized sequence, said equalized sequence including at least a portion of said periodic interference component;
a quantizer configured to receive said equalized sequence and produce a quantized output sequence;

an error sequence generator to generate an error sequence based on a difference between said equalized sequence and said quantized output sequence; and an adaptive tone predictor configured to generate a periodic interference estimate in response to said error sequence, said periodic interference estimate being used to compensate for said periodic interference component.

18. A communication device according to claim 17 further comprising a subtractor configured to subtract said periodic interference estimate from said equalized sequence to produce a toneless sequence.

19. A communication device according to claim 18, further comprising a decision error generator configured to generate a decision error based on a difference between said quantized output sequence and said toneless sequence, wherein said characteristics of said adaptive equalizer is adjusted in response to said decision error.

20. A communication device according to claim 19, wherein characteristics of said adaptive equalizer is adjusted in response to said decision error using a least-mean-square algorithm associated with said adaptive equalizer.

21. A communication device according to claim 18, wherein said input sequence further includes a noise component, and said communication device further comprising:
a decision error generator configured to generate a decision error based on a difference between said quantized output sequence and said toneless sequence;
a noise predictor configured to produce a noise component estimate based on said decision error; and
a noise subtractor configured to subtract said noise component estimate from said toneless sequence.

22. A communication device according to claim 17 further comprising a decision error generator configured to generate a decision error based on a difference between said quantized output sequence and said toneless sequence, wherein characteristics of said adaptive tone predictor is adjusted in response to said decision error.

23. A communication device according to claim 17 further comprising a delay element configured to delay said equalized sequence to generate a delayed equalized sequence, wherein said error sequence generator generates said error sequence based on a difference between said delayed equalized sequence and said quantized output sequence.

24. A communication device according to claim 17 further comprising:
a down sampler having an output operatively associated with an input of said delay element, said down sampler being configured to reduce a sampling rate associated with said equalized sequence; and
an up sampler having an input operatively associated with an output of said adaptive tone predictor, said up sampler being configured to increase a sampling rate associated with said periodic interference estimate.

25. A communication device capable of canceling periodic interference, said communication device comprising:
a transmitter configured to transmit an original sequence;
a receiver configured to receive an echo-corrupted sequence, said echo-corrupted sequence including an echo component associated with said original sequence and a periodic interference component;
an adaptive echo canceler configured to generate an echo estimate in response to said echo-corrupted sequence, said echo estimate being used to compensate for said echo component;

an echo subtractor configured to subtract said echo estimate from said echo-corrupted sequence to obtain an echo-reduced sequence;
an adaptive tone predictor configured to generate a periodic interference estimate in response to said echo-reduced sequence; and
an error sequence generator configured to generate an error sequence based on a difference between said echo-reduced sequence and said periodic interference estimate;
wherein characteristics of said adaptive echo canceler is adjusted in response to said error sequence.

26. A communication device according to claim 25, wherein said characteristics of said adaptive echo canceler is adjusted using a least-mean-square algorithm associated with said adaptive echo canceler.

27. A communication device according to claim 25 further comprising a delay element configured to delay said echo-reduced sequence to obtain a delayed echo-reduced sequence, wherein said adaptive tone predictor generates said periodic interference estimate in response to said delayed echo-reduced sequence.

28. A communication device according to claim 25 further comprising:
a down sampler having an output operatively associated with an input of said delay element, said down sampler being configured to reduce a sampling rate associated with said echo-reduced sequence; and
an up sampler having an input operatively associated with an output of said adaptive tone predictor, said up sampler being configured to increase a sampling rate associated with said periodic interference estimate.

29. A communication device capable of canceling periodic interference, said communication device comprising:
a transmitter configured to transmit an original sequence;
a receiver configured to receive an echo-corrupted sequence, said echo-corrupted sequence including an echo component associated with said original sequence and a periodic interference component;
an adaptive echo canceler configured to generate an echo estimate in response to said echo-corrupted sequence, said echo estimate being used to compensate for said echo component;
an echo subtractor configured to subtract said echo estimate from said echo-corrupted sequence to obtain an echo-reduced sequence;
an adaptive tone predictor configured to generate a periodic interference estimate in response to said echo-reduced sequence; and
an error sequence generator configured to generate an error sequence based on a difference between said echo-reduced sequence and said periodic interference estimate;
wherein characteristics of said adaptive tone predictor is adjusted in response to said error sequence.

30. A communication device according to claim 29, wherein said characteristics of said adaptive tone predictor is adjusted using a least-mean-square algorithm associated with said adaptive tone predictor.

31. A communication device according to claim 29 further comprising a delay element configured to delay said echo-reduced sequence to obtain a delayed echo-reduced sequence, wherein said adaptive tone predictor generates said periodic interference estimate in response to said delayed echo-reduced sequence.

32. A communication device according to claim 29 further comprising:

a down sampler having an output opratively associated with an input of said delay element, said down sample being configured to reduce a sampling rate associated with said echo-reduced sequence; and an up sampler having an input opratively associated with an output of said adaptive tone predictor, said up sampler being configured to increase a sampling rate associated with said periodic interference estimate.

* * * * *